July 15, 1941.  J. E. WOODBURY  2,249,589
RANGE FINDER
Filed Oct. 30, 1939  2 Sheets-Sheet 1
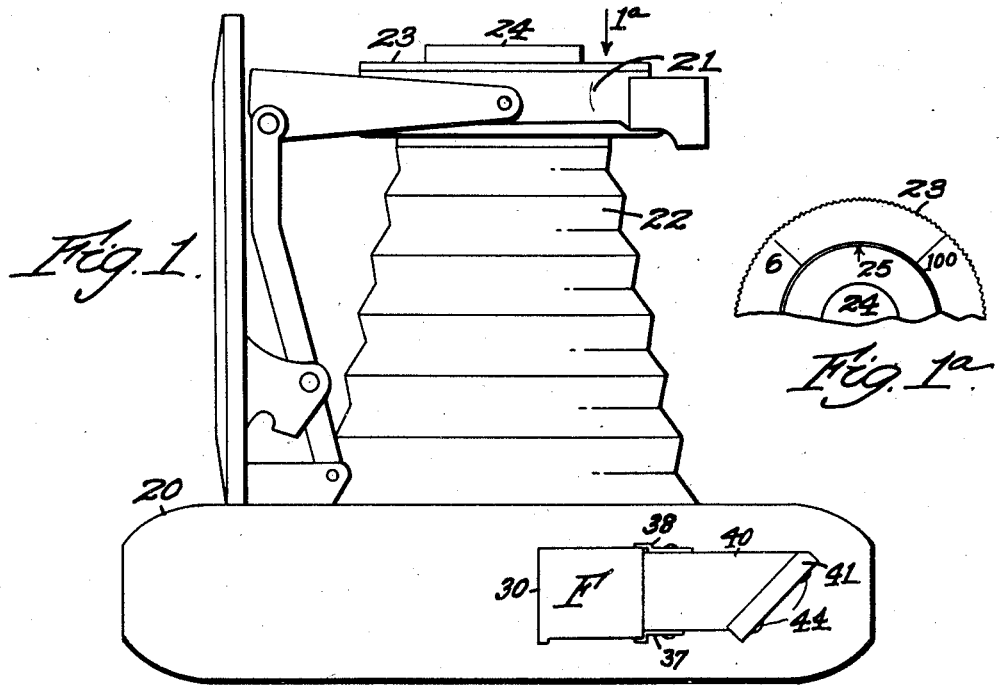
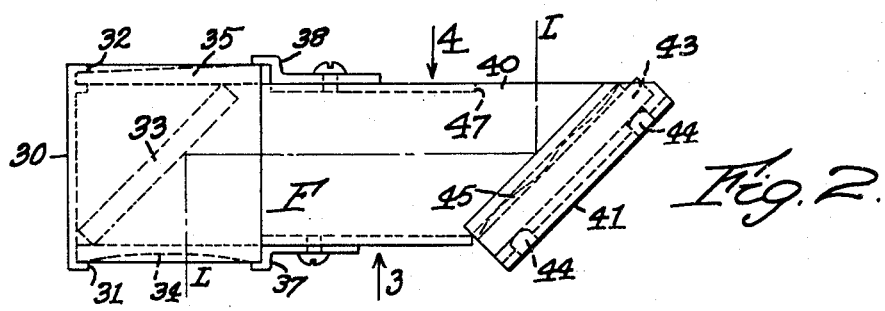
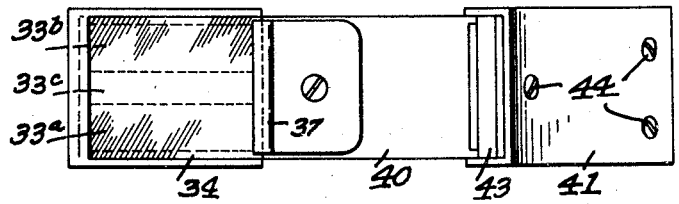
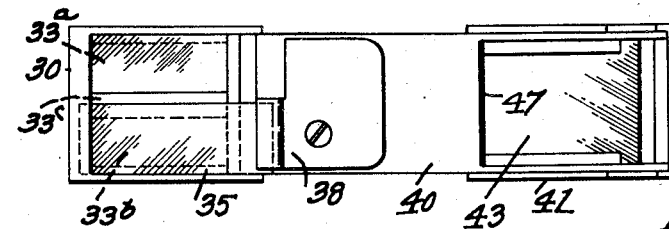
Inventor
John E. Woodbury July 15, 1941.  J. E. WOODBURY  2,249,589
RANGE FINDER
Filed Oct. 30, 1939    2 Sheets-Sheet 2
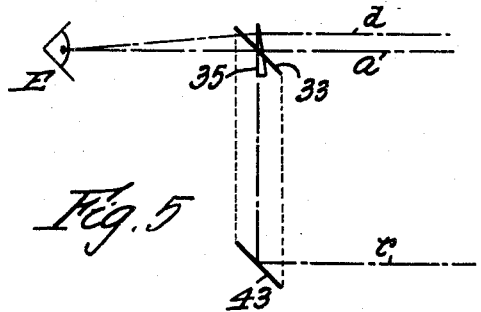
Fig. 5
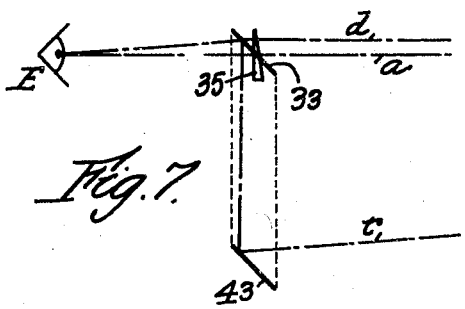
Fig. 7
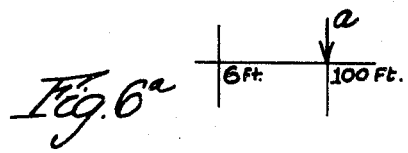
Fig. 6ª
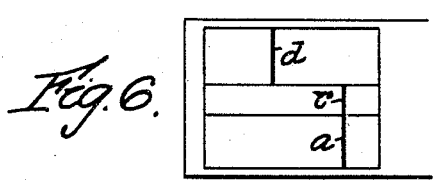
Fig. 6.
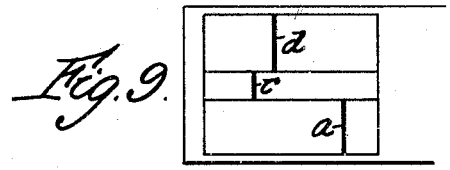
Fig. 9.
Fig. 9ª
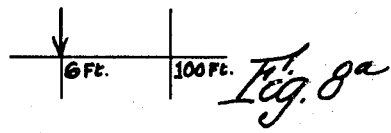
Fig. 8ª
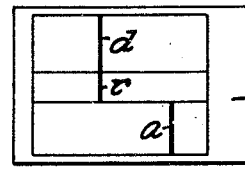
Fig. 8.
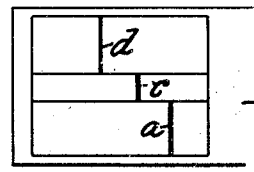
Fig. 10.
Fig. 10ª
Inventor
John E. Woodbury Patented July 15, 1941

2,249,589

UNITED STATES PATENT OFFICE 2,249,589

RANGE FINDER

John E. Woodbury, Worcester, Mass.

Application October 30, 1939, Serial No. 301,908

1 Claim. (Cl. 95—44)

This invention relates to a rangefinder particularly designed for use with small hand cameras and is a further development of the rangefinder disclosed in my prior patent, No. 2,057,549, issued October 13, 1936.

It is the general object of my present invention to provide a rangefinder by which certain selected distances can be directly determined with great accuracy and by which intermediate or associated distances can be determined relatively and with sufficient accuracy to secure satisfactory photographic results.

A further object of the invention is to obtain the above described results by the use of an extremely simple device comprising few and inexpensive parts and having no moving parts nor parts which require adjustment when in use.

More specifically I provide a rangefinder which produces a direct view of an object, an adjacent but slightly deflected view of the same object, and a third adjacent view of the object reflected from a point somewhat displaced laterally from the viewpoint of the direct and deflected views.

My invention further relates to arrangements and combinations of parts which will be hereinafter described and more particularly pointed out in the appended claim.

A preferred form of my invention is shown in the drawings, in which

Fig. 1 is a plan view of a commercial camera with my improved rangefinder mounted thereon;

Fig. 1a is a detail view, looking in the direction of the arrow 1a in Fig. 1;

Fig. 2 is an enlarged plan view of the rangefinder;

Fig. 3 is a front view thereof, looking in the direction of the arrow 3 in Fig. 2;

Fig. 4 is a rear view, looking in the direction of the arrow 4 in Fig. 2;

Fig. 5 is a diagrammatic view showing paths of different light rays from a distant object;

Fig. 6 shows the indication of said light rays in the rangefinder;

Fig. 7 is a diagrammatic view showing the paths of different light rays from a relatively near object;

Fig. 8 shows the indication in the rangefinder of the light rays diagrammed in Fig. 7;

Fig. 9 shows the corresponding rangefinder indication for a still nearer object;

Fig. 10 shows the rangefinder indication for an object at an intermediate distance; and Figs. 6a, 8a, 9a and 10a indicate focussing settings corresponding to the rangefinder indications shown in Figs. 6, 8, 9 and 10 respectively.

Referring to Fig. 1, I have shown my improved rangefinder F mounted on the casing or body 20 of a small hand camera having the usual lens-supporting front frame 21 and bellows connection 22. Focussing is ordinarily accomplished in such cameras by turning a focussing dial ring 23 (Fig. 1a) mounted concentric with the lens 24 in the front frame 21.

When used with my invention, the ring 23 is preferably provided with a distant graduation, as 100, and a near graduation, as 6. These graduations, when aligned with a fixed index mark 25, adjust the focus for objects at distances of 100 feet and 6 feet respectively. These fixed indications are used for reference marks in connection with my improved rangefinder, it being understood that other near or remote distances may be selected in place of 6 feet and 100 feet, if so desired.

My improved rangefinder comprises a casing 30 having a front opening 31 and a rear opening 32 at one end portion thereof. A mirror 33 is mounted at an angle, preferably 45°, in the casing 30, and is provided with upper and lower clear portions 33a and 33b and with a relatively narrow horizontal silvered portion 33c.

A negative or reducing lens 34 is mounted in the front opening 31 to facilitate reading of rangefinding indications. A plane narrow-angle prism 35 is mounted in the rear opening 32 and covers the upper portion of said rear opening which is in alignment with the upper clear portion 33b of the mirror 33. The lower part of the rear opening 32 is left open or may be closed with clear glass to exclude dirt. Clips or clamping devices 37 and 38 secure the lens 34 and the prism 35 in position in the openings 31 and 32.

The casing 30 has a lateral extension 40, with an end casing member 41 fixed thereto. The end of the extension 40 is cut at an angle of 45° and the end casing member 41 is disposed at a similar angle. A mirror 43 is mounted in the end casing 41 and is engaged by three adjusting screws 44 by which it may be forced against a spring or resilient packing material 45, interposed between the face of the mirror and the beveled end of the extension 40, which beveled end may have inwardly projecting flanges if deemed advisable.

By adjustment of the screws 44, the mirror 43 may be easily set exactly parallel to the mirror 33 previously described. The resilient material 45 may be impregnated with cement or shellac or some similar substance which will harden and thus retain the mirror 43 permanently in adjusted position.

The back side of the extension 40 has a clear opening 47 through which light rays may enter, to be successively reflected by the mirrors 43 and 33 as indicated at L in Fig. 2. Any suitable means may be provided on the casing 30 by which the range finder F may be mounted and secured on the camera casing 20.

Having described the details of construction of my improved range finder, I will now describe its use and method of operation.

It will be evident from the previous description that when an object is viewed through the range finder lens 34, three different images of the object will be seen. A direct view will be seen through the lower clear portion 33a of the mirror 33. A slightly deflected view will be seen through the prism 35 and the upper clear portion 33b of the mirror 33. At the same time, the silvered middle portion 33c of the mirror 33 will present a view of the object as reflected from a point laterally displaced by the distance between the mirrors 33 and 43.

The paths of the different rays of light in the three described views appear as in Fig. 5 when the object is at a substantial distance, assumed for the purposes of this application to be 100 feet or over. In Fig. 5, the ray $a$ is a ray direct from the object through the clear portion 33a of the mirror 33. The ray $d$ is a ray direct from the object but deflected through the prism 35, and the ray $r$ is a ray reflected by the mirrors 43 and 33. The object being distant, the rays $a$ and $r$ are substantially parallel, the angles of reflection are each 90°, and the rays $a$ and $r$ appear to enter the eye E of the observer from the same point, while the ray $d$ appears to enter from a point spaced at one side from the ray $a$.

Assuming that the object is upright and narrow, the rays $a$, $r$ and $d$ will appear to the observer as indicated in Fig. 6, with the rays $a$ and $r$ in alignment and with the ray $d$ substantially displaced laterally. On observing such an indication, the focussing dial ring 23 would be set at 100, as indicated by the arrow $a$ in Fig. 6a.

If, however, the range finder is sighted on a relatively near object, say at a distance of 6 feet, the paths of the direct ray $a$ and the deflected ray $d$ will remain substantially unchanged, but the path of the reflected ray $r$ will be altered, as this ray is no longer substantially parallel to the ray $a$. The effect on the reflected ray $r$ at a distance of 6 feet will be as indicated in Figs. 7 and 8, with said reflected ray $r$ apparently aligned with the deflected ray $d$. When such an indication appears in the range finder, the dial ring 23 will be moved to the 6 foot indication, as shown by the arrow in Fig. 8a.

If the rangefinder is sighted on an object nearer than 6 feet, the reflected ray $r$ will appear at the left of the deflected ray $d$, as shown in Fig. 9, while if the rangefinder is sighted on an object at an intermediate distance, the reflected ray $r$ will appear at some intermediate point between the rays $d$ and $a$, as indicated in Fig. 10.

By using a prism 35 of the correct angle, the displacement of the ray $r$ relative to the substantially fixed indications of the rays $a$ and $d$ will be proportional to the required setting of the focussing ring 23 relative to the lines 6 and 100.

Using the distance between the indications $a$ and $d$ as a reference unit, displacement of the indication $r$ one-third of this distance to the left of $d$, as shown in Fig. 9, calls for a displacement on the focussing ring 23 to the left of 6 in an amount equal to one-third the distance between the lines 6 and 100 on said ring, all as shown in Fig. 9a. A displacement of the ray $r$ to a point mid-way between the indications $a$ and $d$ as shown in Fig. 10, calls for a corresponding setting of the focussing ring 23 to the mid-position indicated in Fig. 10a.

The knack of proportionate setting of the focussing ring is very easily acquired by practice, and extremely satisfactory results for all general purposes are thus easily attained.

Having thus described my invention and the advantages thereof, I do not wish to be limited to the details herein disclosed, otherwise than as set forth in the claim, but what I claim is:

In a camera rangefinder, the combination of an eye-piece lens having three adjacent fields of view, means located in part of the total field of the lens producing in said eye-piece a direct image of a given object from a given viewpoint to provide one field, means including a prism located in another part of the total field and producing in said eye-piece a closely adjacent and direct but laterally deflected image of the same object from the same viewpoint to provide a second field, and means including a pair of substantially parallel but oppositely inclined mirrors located in still another part of the field and producing in said eye-piece a closely adjacent reflected image of the same object from a point of observation substantially displaced laterally from the viewpoint of the direct and deflected images to provide a third field, the correct focal adjustment of the camera for the object distance being indicated by the lateral displacement of the reflected image relative to the direct image and to the deflected image.

JOHN E. WOODBURY.